UNITED STATES PATENT OFFICE.

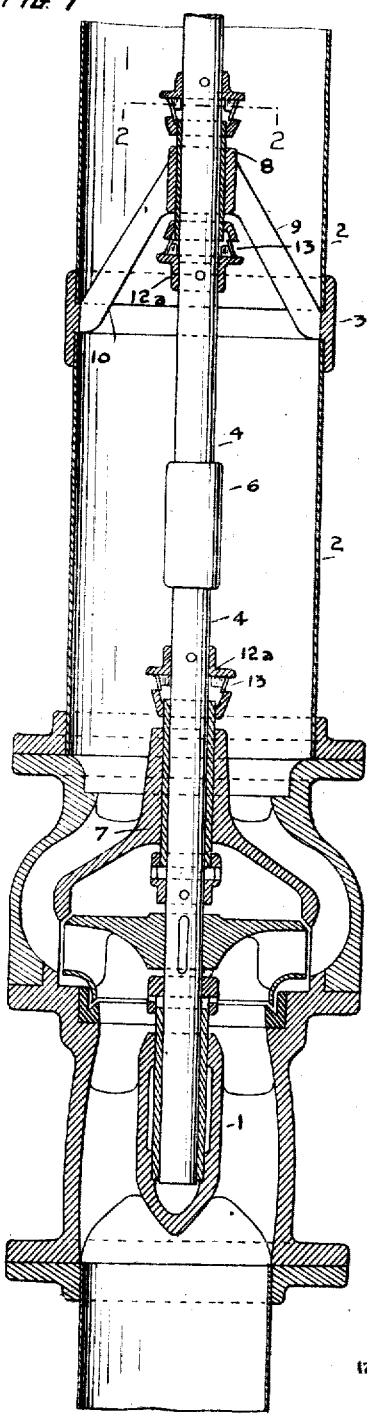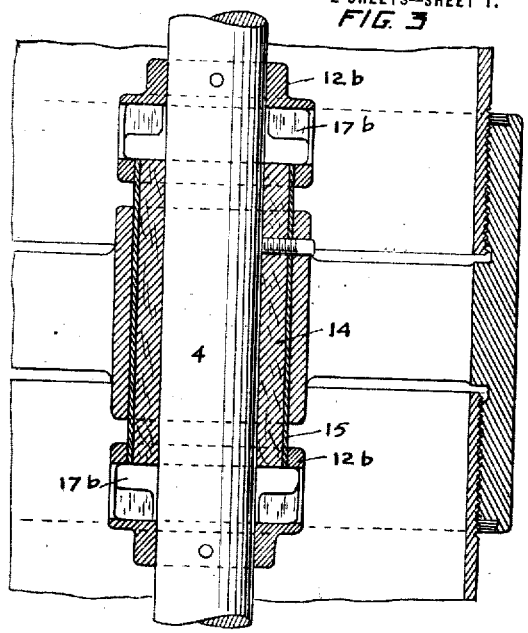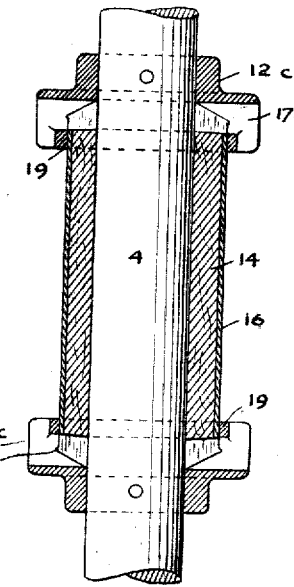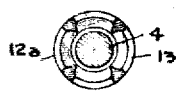

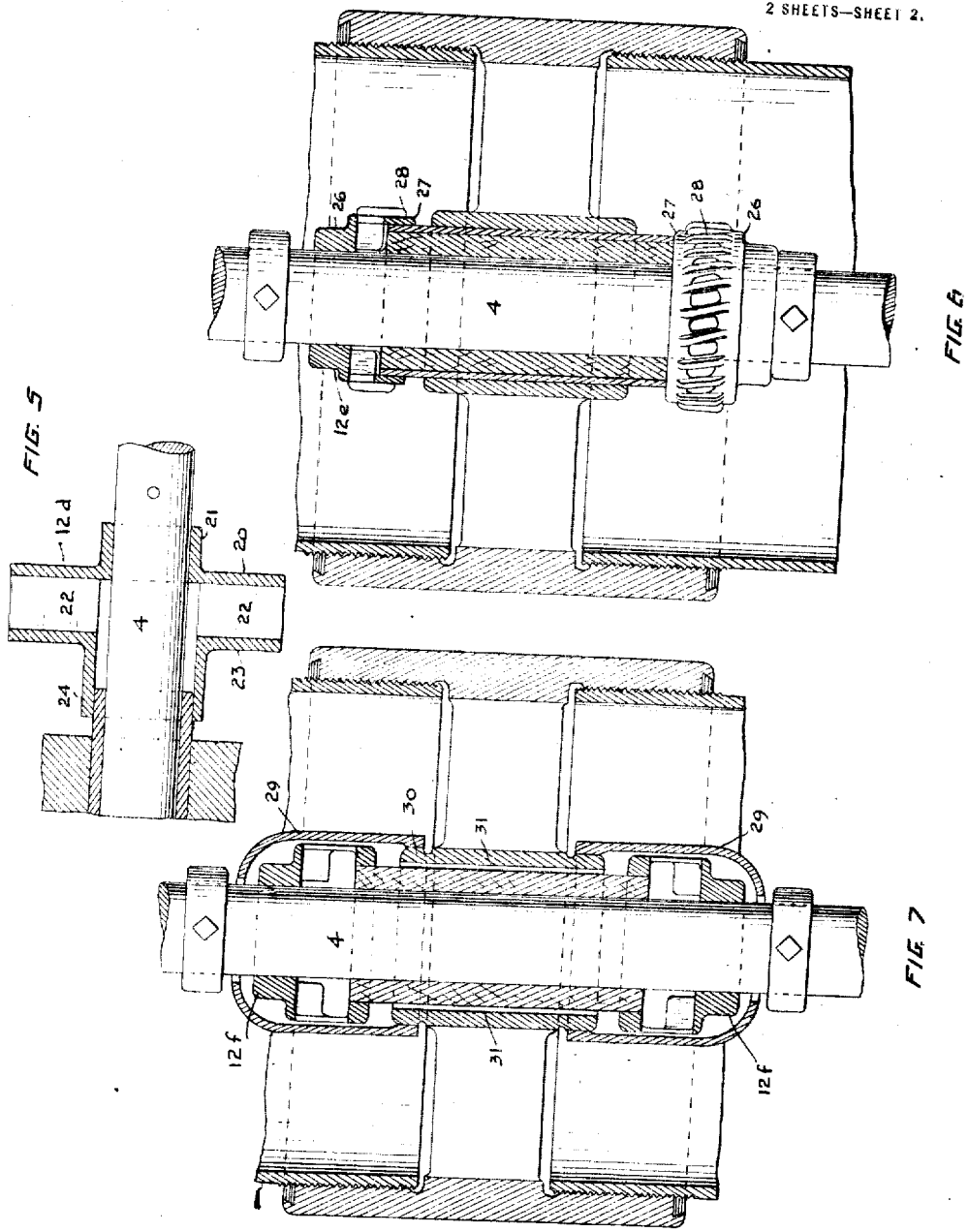

ROBERT SCHORR, OF SAN FRANCISCO, CALIFORNIA, ASSIGNOR TO BYRON JACKSON IRON WORKS, INC., OF SAN FRANCISCO, CALIFORNIA, A CORPORATION OF CALIFORNIA.

BEARING-PROTECTOR FOR DEEP-WELL PUMPS AND THE LIKE.

1,336,540.  Specification of Letters Patent.  Patented Apr. 13, 1920.

Application filed August 29, 1918. Serial No. 251,869.

*To all whom it may concern:*

Be it known that I, ROBERT SCHORR, a citizen of the United States, residing at San Francisco, in the county of San Francisco and State of California, have invented new and useful Improvements in Bearing-Protectors for Deep-Well Pumps and the like, of which the following is a specification.

Shaft bearings of machines, or of power-transmission-systems, are frequently located in fluids or other surroundings contaminated with sand, grit, or other solid matter, which, by finding its way between the shaft and the bearing sleeve, in time ruins both, thus causing expensive replacements and shut-downs. A very serious instance of such occurrence is the location of bearings in the discharge-column of deep-well turbine-pumps, because a good deal of sand is often carried by the water when first starting to pump a new well. For that reason elaborate protecting casings for the shaft and bearings are provided in some of the deep well pumps on the market. But again, such casings necessitate very careful workmanship and skill in assembling, and are therefore expensive.

The object of the present invention is to provide comparatively simple and inexpensive means for protecting bearings from the entrance thereinto of solid matter. Such bearings are preferably of self-lubricating composition or of lignum-vitæ. If made of other material, lubricant has to be piped to each bearing.

The fundamental idea embodied in my invention is to place at the ends of the bearing revolving caps, disks, or bodies, to render uniform the pressure at the bearing ends and in the bearing itself, to prevent circulation of water therethrough if the bearing is submerged, as is the case in many pump and turbine designs.

The revolving caps or the like may be fastened to the shaft or they may be caused to rotate by the discharging water-column itself. It will be understood that each revolving cap will produce a lowering of pressure at the adjacent bearing end, and if both caps are of equal diameter and otherwise alike, the zone between the bearing-sleeve and shaft will be of uniform pressure throughout, and no circulation of water will occur therethrough, and consequently no solid matter will pass to damage the bearing or shaft.

The revolving caps may be conical or cylindrical, and, if hollow, either plain inside or provided with ribs. Plain or ribbed disks can also be used, and it is immaterial whether the shaft is disposed vertically, horizontally, or at an incline.

The revolving centrifugal bodies may also be housed in inclosures provided at the ends of the bearing.

In the accompanying drawing, Figure 1 is a central longitudinal section through a deep well turbine pump having bearings equipped with my improvements; Fig. 2 is a cross-section of Fig. 1 on the line 2—2; Figs. 3, 4, 5, 6, 7, are views similar to Fig. 1 showing modifications of the invention.

Referring to the drawing, 1 indicates a turbine pump discharging water upwardly through a casing composed of casing sections 2 connected by couplings 3, (only one coupling being here shown) and around a shaft comprising shaft sections 4 connected by couplings 6. Said shaft sections 4 are guided in bearings 7, 8, supported by arms 9, 10. For the purpose of lowering, and at the same time equalizing, the pressure around the shaft at the ends of each bearing there are centrifugal devices, either secured to the shaft or revolving loosely around it.

In Fig. 1, these devices 12ª are shown as hollow frustra of cones having openings 13 through the wide parts of said cones, the narrow parts of the cones surrounding the ends of the bearing. It will be evident that, as said centrifugal devices rotate with the shaft, any water that may enter said devices will, by centrifugal force, escape through the openings 13, and will be prevented from passing between the shaft and the bearing. Moreover, if the two devices at opposite ends of the bearing are of the same size and form, the reduction in pressure will be substantially the same at both ends, and consequently there will be no flow of water from one end to another in the bearing. Also, any sand that may pass with water between the outer surface of either end of the bearing and the narrow portion of the surrounding cone will be projected by the centrifugal device through an opening 13 therein, and prevented from passing between the shaft and the bearing.

In the form of the invention shown in Fig. 3 the shaft is inclosed in a lignum-vitæ bearing 14, surrounded by a metal sleeve 15. The centrifugal devices 12$^b$ are here shown as cylindrical, and as having radially directed ribs or vanes 17$^b$.

In the form of the invention shown in Fig. 4 the centrifugal devices 12$^c$ are in the form of disks 16 having rigidly extending ribs or vanes 17$^c$, all connected to a collar 19 surrounding the outer end of the metal sleeve 16.

In the form of the invention shown in Fig. 5 the shaft is arranged horizontally and the centrifugal device 12$^d$ at each end of the bearing comprises a disk 20 having a hub 21 secured to the shaft and having integral therewith radially extending ribs 22, which ribs are also formed integral with a disk 23 having a hub 24 surrounding the adjacent end of the bearing.

In the form of the invention shown in Fig. 6, the centrifugal devices 12$^e$ are loose around the shaft, and are rotated by the movement of the water column. Each consists of a disk 26 surrounding the shaft, a collar 27 surrounding the bearing, and helical blades 28 connected at their ends to said disk and collar.

In the form of the invention shown in Fig. 7, the centrifugal devices 12$^f$ are inclosed by housings 29, each secured at one end to the bearing 30 and at the other end contracted and spaced from the shaft. Ample by-passes 31 are formed in the bearing and, should any tendency to circulate exist, the flow would follow the line of least resistance, that is, through the by-passes and not along the shaft.

It is obvious that a single centrifugal device at one end of the bearing will produce a rapid circulation of water through the bearing to said device. If two such devices of different diameters are employed at opposite ends of the bearing, they will produce a circulation of water toward the centrifugal device of greater diameter.

If both centrifugal devices are, however, equal in every respect, both will lower the pressure to the same degree, thus establishing an equilibrium in the space between the bearing surface and the shaft and no circulation will be possible.

The use of centrifugal devices at the bearings in the discharge column of pumps will not be power-absorbing; on the contrary, each such device acts to some extent as a so-called "booster-pump".

Any difference in the fluid pressures at the ends of the bearing which may be found to exist can be eliminated experimentally by varying the relation between the diameters of the centrifugal devices.

All of the devices and arrangements herein illustrated and described may be varied in many ways without departing from the spirit and scope of my invention.

I claim:

1. Means for preventing wear on a bearing immersed in a fluid containing foreign matter comprising centrifugal devices at the respective ends of the bearing equalizing the fluid pressure at said ends.

2. Means for preventing wear on a bearing immersed in a fluid containing foreign matter, comprising means for equalizing the fluid pressures at the ends of the bearing.

ROBERT SCHORR.